United States Patent

Engelhardt et al.

[11] Patent Number: 5,903,688
[45] Date of Patent: May 11, 1999

[54] DEVICE FOR FEEDING A UV LASER INTO A CONFOCAL LASER SCANNING MICROSCOPE

[75] Inventors: Johann Engelhardt, Bad Schoenborn; Heinrich Ulrich, Heidelberg; Klaus Kierschke, Schriesheim, all of Germany

[73] Assignee: Leica Lasertechnik GmbH, Heidelberg, Germany

[21] Appl. No.: 08/793,005

[22] PCT Filed: Jul. 6, 1995

[86] PCT No.: PCT/EP95/02627

§ 371 Date: Feb. 6, 1997

§ 102(e) Date: Feb. 6, 1997

[87] PCT Pub. No.: WO96/06377

PCT Pub. Date: Feb. 29, 1996

[30] Foreign Application Priority Data

| Aug. 25, 1994 | [DE] | Germany | 4430012 |
| Sep. 8, 1994 | [DE] | Germany | 4431912 |
| Dec. 23, 1994 | [DE] | Germany | 4446185 |

[51] Int. Cl.⁶ .................................................. G02B 6/42
[52] U.S. Cl. .............................. 385/31; 385/147; 359/384
[58] Field of Search .................................. 385/31, 88, 91, 385/93, 147; 359/384, 385, 390

[56] References Cited

U.S. PATENT DOCUMENTS

| 3,339,370 | 9/1967 | Streich | 62/14 |
| 4,500,204 | 2/1985 | Ogura | 356/318 |
| 4,626,679 | 12/1986 | Kuwayama et al. | 250/227 |
| 5,161,053 | 11/1992 | Dabbs | 359/384 |
| 5,233,197 | 8/1993 | Bowman et al. | 250/461.1 |
| 5,400,176 | 3/1995 | Dreessen et al. | 359/385 |
| 5,404,238 | 4/1995 | Dressen et al. | 359/385 |
| 5,535,052 | 7/1996 | Jörgens | 359/388 |

FOREIGN PATENT DOCUMENTS

| 0176358B1 | 7/1992 | European Pat. Off. . |
| 0 592 089 | 4/1994 | European Pat. Off. . |
| 216 323 | 12/1984 | Germany . |
| 4323129A1 | 7/1993 | Germany . |
| WO 92/18850 | 10/1992 | WIPO . |

OTHER PUBLICATIONS

Barber et al., "Spatial distribution of protein in interstital matrix of rat mesenteric tissue," American Physiological Society, pp. H556–H564, 1990.
DIN–Norm EN 60825–1 "Safety of laser devices" of 1994 (corresponding to IEC Standard 825–1–1993 of Nov. 1993).
A. Christyne Bliton et al., "Optical Considerations at Ultraviolet Wavelengths in Confocal Microscopy," *Handbook of Biological Confocal Microscopy*, Second Edition, Plenum Press, New York, 1995, pp. 431–444. No Month.

Primary Examiner—Phan T.H. Palmer
Attorney, Agent, or Firm—Foley & Lardner

[57] ABSTRACT

A device for feeding a light beam from a UV laser (1) into a laser scanning microscope (2) has a beam-alignment assembly (3) for aligning the laser beam with the beam path of the microscope (2) and an optical-fiber element (4) located between the UV laser (1) and the beam-alignment assembly (3). The aim of the invention is to design the feed device so that it can be used for long periods in order to keep the time and expense necessary to change the feed device as low as possible. To achieve this, the invention provides a beam interrupter (5) located between the UV laser (1) and the optical-fiber element (4). The beam interrupter allows the beam from the UV laser (1) to pass through the optical-fiber element (4) only during scanning, i.e., when pictures are being generated.

10 Claims, 1 Drawing Sheet

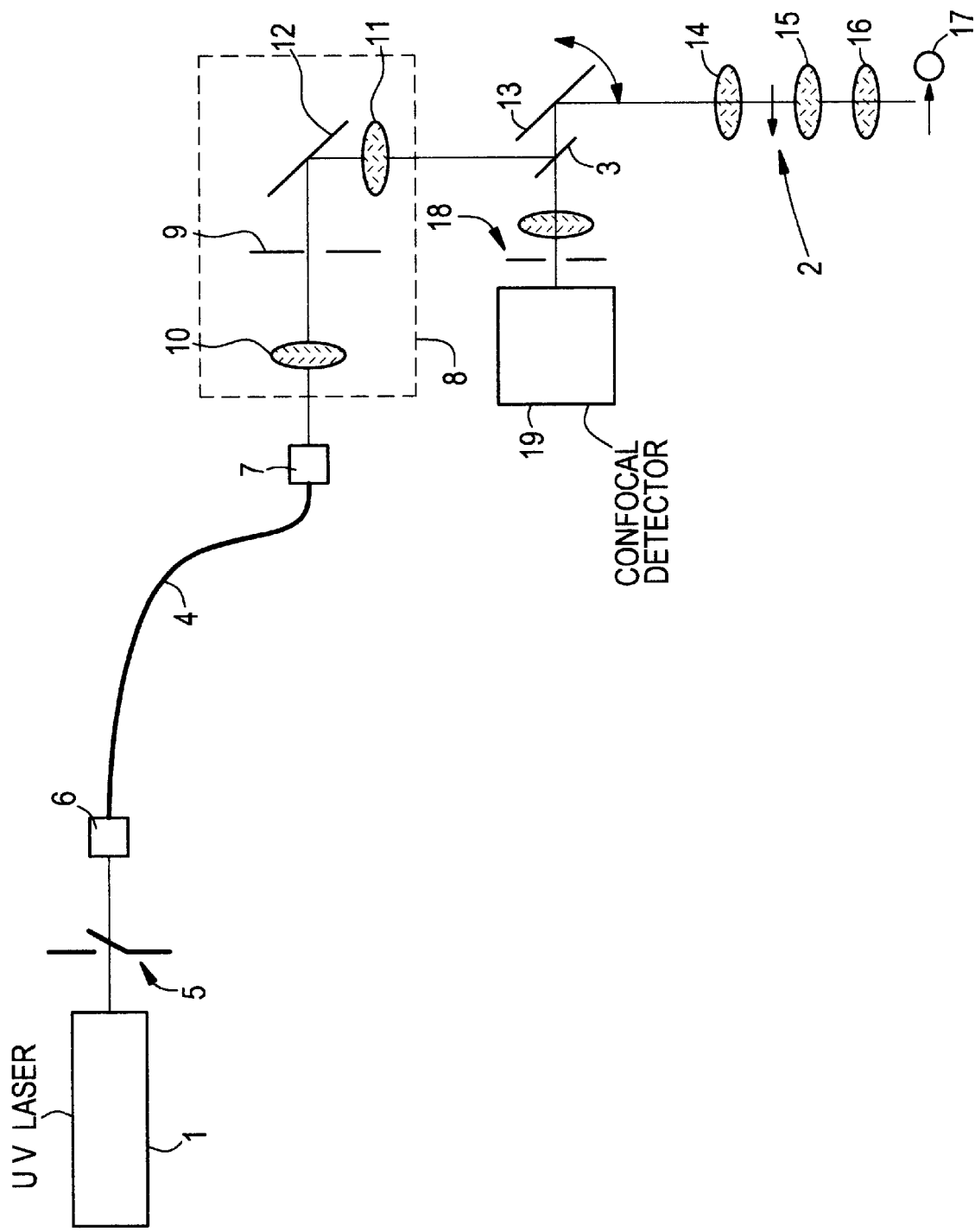

ered permanent adjustment substantially difficult.
DEVICE FOR FEEDING A UV LASER INTO A CONFOCAL LASER SCANNING MICROSCOPE The invention relates to a device for feeding the a UV laser beam into a confocal scanning laser microscope, having a device for the parallel alignment of the UV laser beam with the beam path of the scanning laser microscope, and having a flexible optical fiber element arranged between the UV laser and an adjusting device. The element guides the UV laser beam to the scanning laser microscope and in so doing reduces the transmission of mechanical vibrations of the UV laser to the scanning laser microscope.

BACKGROUND

Two different possibilities for feeding the light beam of a laser into a scanning laser microscope are known in principle from the prior art. For example, reference may be made here to the published application of the International Patent Application WO 92/18850 and to the published application of the European Patent Application 0 592 089. Both publications describe direct feeding of the UV laser light via a mechanically rigid arrangement of optical modules such as lenses, filters, pinhole diaphragms, etc. This type of feeding gives rise to very large systems which are held together optomechanically and necessarily have long beam paths. Long beam paths lead, in turn, to instabilities of adjustment in the system. The vibrations of the laser caused by cooling represent a large problem in the adjustment of such systems. In the case of direct opto-mechanical feeding of the laser light beam into the scanning microscope, the vibrations of the laser cooling are frequently transmitted onto the microscope, thereby producing image interference and rendering permanent adjustment substantially difficult.

As an alternative to direct feeding, there is the possibility of fiber-optic feeding of light such as is described, for example, in the U.S. Pat. No. 5 161 053, for feeding UV laser light. The laser light is guided into the beam path of the microscope via a flexible optical fiber element. The laser can be quasimechanically decoupled in this way from the microscope, with the result that the vibrations of the laser caused by cooling are not transmitted onto the microscope, but instead are absorbed by the flexible optical fiber element. Furthermore, the beam lengths of the system can be substantially shortened thereby. Optical fibers for UV laser light are already on the market. However, tests have shown that their transparency drops back to less than 10% of the original transparency irreversibly after only a few hours when they are irradiated with more than 10 mW. This is presumably to be ascribed to chemical and photochemical reactions between the actual light-guiding fiber and its coating. For this reason UV lasers have up to now been fed directly into the microscope as a rule.

SUMMARY OF THE INVENTION

It is an object of the invention to increase both the measuring accuracy and the service life of a UV scanning laser microscope.

The device according to the invention for feeding a UV laser beam into a confocal scanning laser microscope achieves the foregoing object by means of the features described below. The device is designed in such a way that mounted between the output of the UV laser and the input of the optical fiber element is a beam interrupter which only uncovers the UV laser beam to the optical fiber element when the UV laser beam is actually required for image recording, and hence reduces the UV loading of the optical fiber element/

It has been realized according to the invention, first of all, that the laser must be mechanically decoupled from the microscope in order to minimize the outlay on adjustment. It has been realized, furthermore, that optical fiber elements which have proved themselves for light of other wavelengths are also the means of choice in the context of UV laser light. Proceeding on this basis, it has been realized that the worsening of the transparency of an optical fiber is a function, on the one hand, of the power of irradiation and, on the other hand, of the period of irradiation, with the result that the service life of an optical fiber and its usefulness for feeding UV laser light can be substantially increased when the optical fiber is irradiated only during scanning, that is to say for the purpose of recording images. Specifically, it has also been realized that there is no need to irradiate the optical fiber element with UV laser light, for example during starting of the laser or of the object device before the actual imaging, or during other times of preparation for experiment, or for the purpose of adjusting the entire optical arrangement. It has been realized, finally, that irradiation of the optical fiber element can be turned off in a simple and advantageous way with the aid of a beam interrupter which is arranged between the UV laser and the optical fiber element and which uncovers the optical fiber element only during scanning.

There are various possibilities for implementing such a beam interrupter. The beam interrupter can be implemented in the form of a mechanical diaphragm or lug by means of which the light beam of the UV laser can be blocked out in a simple fashion. It is to be borne in mind in this case that such mechanical beam interrupters are relatively slow to switch. The switching can be driven, for example, electromagnetically and synchronized automatically with the scanning. The beam interrupter can, however, also advantageously be formed by electro-optical and/or magnetooptical modulation means by which the light beam of the UV laser is deflected. Such optical switches can be provided, for example, as modulation means in the form of quick liquid crystals or other optically active components, which can be switched under computer control and can thus be coordinated in time with the scanning.

In an advantageous refinement, the device according to the invention can comprise one or more filters which are arranged between the UV laser and the beam interrupter, or between the beam interrupter and the optical fiber element. Such filter arrangements are used to block out specific wavelength ranges of the laser light. The necessity of using filter arrangements arises, as a rule, from the type of measurements to be carried out and the objects to be measured. It is important that in the arrangement of the filters in the beam path upstream of the optical fiber element the filters upstream of the microscope are also mechanically decoupled. This is especially advantageous in the case of the use of a filter wheel which comprises a plurality of filters which are positioned in the beam path by mechanical movement, specifically rotation of the wheel. Just like the cooling of the UV laser, the rotation of the filter wheel is associated with vibrations which should as far as possible not be transmitted onto the microscope.

The use of a single-mode optical fiber element has proved to be particularly advantageous, since the light can then be focused particularly effectively in the scanning laser microscope. For the purpose of better energy transmission from the UV laser to the scanning laser microscope, in an advantageous refinement of the device according to the invention a light input coupler is arranged at one end of the optical fiber element and, correspondingly, a light output coupler is arranged at the other end of the optical fiber element.

A particular advantage of the device according to the invention is that the UV laser beam is fed into the optical fiber only if it is actually required for recording images. A further advantage is that adjustment of the UV laser light beam onto the beam path of the scanning laser microscope can also be undertaken using visible light. That is to say, the UV laser need not be switched on for the purpose of adjustment, when there is no need to irradiate the optical fiber element with UV laser light for adjusting purposes. For the purpose of adjustment with visible light, in an advantageous refinement of the device according to the invention there is arranged between the optical fiber element and the actual adjusting device an optical module via which the visible light emerging from the optical fiber element is guided with a defined beam path onto the adjusting device. As a rule, the optical module will be used to render the visible light emerging from the optical fiber element parallel. Here, this optical module can advantageously be a pinhole diaphragm optical system with a lens or a lens system. It is also possible to use a telescopic optical system in order to shorten the beam path. The optical module serves only the purpose of adjustment with visible light. This optical module plays no role during the actual scanning with UV laser light. After the adjustment, it could therefore be removed from the beam path of the measuring arrangement, for example by being swiveled out.

The adjusting device can also be implemented in varied ways. However, it will typically comprise a deflecting element which can be supplied, for example, as an adjustable lens or else a dichroic beam splitter or beam combiner—depending on the measuring arrangement.

There are now various possibilities of advantageously embodying and developing the teachings of the present invention.

BRIEF DESCRIPTION OF THE DRAWINGS

The accompanying single figure shows a diagrammatic representation of one design of a device according to the invention for feeding a light beam of a UV laser into a scanning laser microscope.

EXEMPLARY EMBODIMENTS OF THE INVENTION

The device represented in the single figure is used to feed the light beam of a UV laser 1 into a scanning laser microscope 2. The scanning laser microscope 2 is represented here only in outline by a so-called scanning mirror 13 and an eyepiece 14. The device comprises an adjusting device 3 for aligning the laser light beam with the beam path of the scanning laser microscope 2. Furthermore, a flexible optical fiber element 4 is arranged between the UV laser 1 and the adjusting device 3. Because of the flexibility of the optical fiber element 4, the laser 1 is decoupled from the scanning laser microscope 2 in a quasimechanical fashion, with the result that, for example, vibrations of the laser 1 caused by cooling are not transmitted to the scanning laser microscope 2.

According to the invention, there is arranged between the UV laser 1 and the optical fiber element 4 a beam interrupter 5 by which the optical fiber element 4 is exposed to a light beam of a UV laser 1 only during scanning, that is to say for the purpose of recording images.

In the exemplary embodiment represented here, the beam interrupter 5 is represented in the form of a mechanical diaphragm which simply blocks out the laser light beam upstream of the optical fiber element 4. This diaphragm 5 is preferably actuated automatically in a fashion synchronized with the scanning. When the beam interrupter 5 is open, the laser light beam falls onto a light input coupler 6 arranged at the end of the optical fiber element 4. A light output coupler 7 is correspondingly arranged at the other end of the optical fiber element 4. The optical fiber element 4 in the exemplary embodiment represented is a single-mode optical fiber.

Arranged between the optical fiber element 4 or the light output coupler 7 and the adjusting device 3 is an optical module 8 which is used to adjust the laser light beam emerging from the optical fiber element 4. The adjustment is performed, however, not with the laser light beam itself, but with the aid of visible light, which emerges from the optical fiber element 4, when the laser light beam is blocked out—with the aid of the beam interrupter 5. The optical module 8 is used to render this visible light parallel. For this purpose, the optical module 8 comprises a pinhole diaphragm optical system with a pinhole diaphragm 9 and two lenses 10 and 11, which are respectively arranged in the beam path upstream of and downstream of the pinhole diaphragm 9. In the exemplary embodiment represented here, furthermore, a deflecting mirror 12 is provided which does not, however, influence the functioning of the pinhole diaphragm optical system. With the aid of the pinhole diaphragm optical system, the beam path of the visible light emerging from the optical fiber element 4 is aligned in accordance with the beam path to be expected for the laser light beam. In this way, it is possible to adjust the entire arrangement for the UV laser light with the aid of visible light.

In the exemplary embodiment represented here, a dichroic beam splitter or beam combiner is used as adjusting device 3. The laser beam is steered via the scanning mirror 13 through the eyepiece 14, through the tubular lens 15 and the objective 16 onto the object 17. The light beam running back from the object 17 is split into two component beams of different wavelengths. These component beams are steered in different directions.

The non-deflected component of the light beam coming from the object 17 (fluorescent light or reflected light) is fed to a confocal detector 19 via a pinhole diaphragm optical system 18.

Reference is made to the summary regarding further advantageous refinements of the device according to the invention for feeding the light beam from a UV laser into a scanning laser microscope; they are not represented in the figure.

It may be pointed out in conclusion that the teachings of the invention are not limited to the exemplary embodiments discussed above. Rather, the teachings of the invention may also be implemented by using beam interrupters of different design and a different optical arrangement for adjusting with visible light.

LIST OF REFERENCE NUMERALS

1 UV laser
2 Scanning laser microscope
3 Adjusting device
4 Optical fiber element
5 beam interrupter
6 Light input coupler
7 Light output coupler
8 Optical module 9 Pinhole diaphragm
10 Lens
11 Lens
12 Deflecting mirror
13 Scanning mirror
14 Eyepiece
15 Tubular lens
16 Objective
17 Object
Pinhole optical system
Confocal detector

We claim:

1. An apparatus comprising:
   a UV laser to produce a UV laser beam;
   a confocal laser scanning microscope having a beam path;
   an adjusting assembly to align the UV laser beam with the beam path;
   a flexible optical fiber element, between the UV laser and the adjusting assembly, to guide the UV laser beam from the UV laser to the confocal laser scanning microscope; and
   a beam interrupter, between an output of the UV laser and an input of the optical fiber element, to interrupt the passage of UV light from the UV laser to the optical fiber element when the UV laser beam is not required for image recording to reduce UV loading on the optical fiber element.

2. An apparatus as set forth in claim 1, wherein the beam interrupter is synchronized automatically with scanning such that the optical fiber element is irradiated by light from the UV laser only during scanning.

3. An apparatus as set forth in claim 2, wherein the optical fiber element is a single-mode optical fiber.

4. An apparatus as set forth in claim 1, further comprising an optical module for adjustment of said apparatus using visible light, said optical module being removable from said beam path of said laser scanning microscope after adjustment operation.

5. An apparatus as set forth in claim 1, wherein the beam interrupter includes a mechanical diaphragm to interrupt said passage of UV light.

6. An apparatus as set forth in claim 1, wherein the beam interrupter includes an electrooptical modulator to interrupt said passage of UV light.

7. An apparatus as set forth in claim 1, wherein the beam interrupter includes a magnetooptical modulator to interrupt said passage of UV light.

8. An apparatus as set forth in claim 1, further comprising a filter arrangement for setting a desired wavelength range between the UV laser and the beam interrupter.

9. An apparatus as set forth in claim 1, wherein the optical fiber element is a single-mode optical fiber.

10. An apparatus as set forth in claim 1, further comprising a light input coupler at one end of the optical fiber element and a light output coupler at another end of the optical fiber element.

* * * * *